(12) United States Patent
Jarlengrip (10) Patent No.: US 11,874,659 B2
(45) Date of Patent: Jan. 16, 2024

(54) INFORMATION SYSTEM FOR A WORKING MACHINE

(71) Applicant: Volvo Construction Equipment AB, Eskilstuna (SE)

(72) Inventor: Johan Jarlengrip, Askim (SE)

(73) Assignee: VOLVO CONSTRUCTION EQUIPMENT AB, Eskilstuna (SE)

(*) Notice: Subject to any disclaimer, the term of this patent is extended or adjusted under 35 U.S.C. 154(b) by 568 days.

(21) Appl. No.: 16/620,145

(22) PCT Filed: Jun. 9, 2017

(86) PCT No.: PCT/EP2017/064082
§ 371 (c)(1),
(2) Date: Dec. 6, 2019

(87) PCT Pub. No.: WO2018/224160
PCT Pub. Date: Dec. 13, 2018

(65) Prior Publication Data
US 2020/0150650 A1 May 14, 2020

(51) Int. Cl.
*G05D 1/00* (2006.01)
*G06F 16/29* (2019.01)
*E02F 9/22* (2006.01)
*G06V 20/56* (2022.01)

(52) U.S. Cl.
CPC .......... *G05D 1/0055* (2013.01); *E02F 9/226* (2013.01); *G06F 16/29* (2019.01); *G06V 20/56* (2022.01); *G05D 2201/0201* (2013.01)

(58) Field of Classification Search
CPC .......... G05D 1/0055; G05D 2201/0201; E02F 9/226; E02F 9/261; E02F 9/245; G06F 16/29; G06V 20/56; B60Q 2800/20
See application file for complete search history.

(56) References Cited

U.S. PATENT DOCUMENTS

| 6,253,870 B1 | 7/2001 | Tokimatsu et al. |
| 6,665,617 B2 | 12/2003 | Shobayaski |
| 2003/0128182 A1* | 7/2003 | Donath ................. G01C 21/26 345/156 |
| 2007/0139176 A1 | 6/2007 | Victor et al. |

(Continued)

FOREIGN PATENT DOCUMENTS

| CN | 1057112 A | 12/1991 |
| CN | 1387051 A | 12/2002 |

(Continued)

OTHER PUBLICATIONS

International Search Report and Written Opinion dated Feb. 15, 2018 for International Application No. PCT/ EP2017/064082, 14 pages.

(Continued)

*Primary Examiner* — Shon G Foley
(74) *Attorney, Agent, or Firm* — Sage Patent Group (57) ABSTRACT

The present disclosure generally relates to an information system for a working machine, specifically adapted for projecting an image onto an area externally of the working machine based on construction data relating to a surrounding of the working machine. The present disclosure also relates to a corresponding method and computer program for such a working machine.

16 Claims, 4 Drawing Sheets

(56) References Cited

U.S. PATENT DOCUMENTS

| | | | |
|---|---|---|---|
| 2008/0162004 | A1 | 7/2008 | Price et al. |
| 2010/0265472 | A1 | 10/2010 | Campbell |
| 2014/0188333 | A1 | 7/2014 | Friend |
| 2016/0193920 | A1 | 7/2016 | Tsubone et al. |
| 2016/0326724 | A1 | 11/2016 | Hartman et al. |
| 2017/0280114 | A1* | 9/2017 | Samuelson ........... G06T 3/0068 |
| 2017/0351240 | A1* | 12/2017 | Li .......................... G05B 19/31 |

FOREIGN PATENT DOCUMENTS

| | | |
|---|---|---|
| DE | 102011119923 A1 | 5/2013 |
| EP | 3122037 A1 | 1/2017 |
| EP | 3504084 A1 | 7/2019 |
| EP | 3594415 A1 | 1/2020 |
| JP | 2015-195457 A | 11/2015 |
| KR | 20140084409 A | 7/2014 |
| NO | 2016163294 A1 | 10/2016 |

OTHER PUBLICATIONS

Chinese First Office Action dated Mar. 31, 2021 for Chinese Patent Application No. 201780091666.4, 14 pages (including English translation).

European Office Action pursuant to Article 94(3) EPC for European Patent Application No. 17732350.8, dated Dec. 23, 2022, 7 pages.

* cited by examiner

INFORMATION SYSTEM FOR A WORKING MACHINE

CROSS REFERENCE TO RELATED APPLICATIONS

This application is a 35 U.S.C. § 371 national stage application of PCT International Application No. PCT/EP2017/064082 filed on Jun. 9, 2017, the disclosure and content of which are incorporated by reference herein in their entirety.

TECHNICAL FIELD

The present disclosure generally relates to an information system for a working machine, specifically adapted for projecting an image onto an area externally of the working machine based on construction data relating to a surrounding of the working machine. The present disclosure also relates to a corresponding method and computer program for such a working machine.

BACKGROUND

Working machines, in the form of e.g. excavators, dozers, loaders, and the like, may be used to perform various tasks in construction, mining and/or landscaping operations. Such working machines may generally be equipped with one or more work implements that can engage various objects to assist in performing the tasks. The work implements may be adjustable or manipulated in an intended manner by an operator, who e.g. may be positioned on-board the working machine. There exist various control systems and technologies to be incorporated into such working machines for assist its operator in controlling the working machine and/or work implements. These systems and technologies can interact with various a multitude of sensors for providing information and data to the operator regarding the working machine and/or work implements to further assist in control of the same.

Recent advances in computer science now allows the above mentioned control systems providing assistance to the operator to, in real-time, correlate data acquired by the sensors with a dynamic structural environment in which the working machine is operating. Based on the correlation, a so-called augmented reality (AR) may be displayed to the operator for assisting the operator in manipulating the working machine.

Specifically, AR may provide the operator with a view of a physical, real-world environment whose elements are augmented (or supplemented) by computer-generated sensory input such as sound, text, graphics, or video. In a typical prior-art AR application, a data processor reviews a camera-captured image for cues that trigger the display of additional information and images along with a display of the captured image.

The AR information may for example be presented to the operator using a display screen arranged within an operator compartment comprised with the working machine. However, such an implementation makes in necessary for the operator to split his attention between the display and e.g. the work implement, making the operation precarious and tiresome.

A more dynamic approach may as an alternative be taken, such as disclosed in US20140188333, where the operator is provided with a head mounted display (HMD) that is adapted for augmented reality capabilities. According to US20140188333, AR information may additionally be allowed to assist the operator to "see" the work implement even in cases where the work implement is obstructed from the direct view of the operator.

Even though the solution presented in US20140188333 provides great improvements to the safety operation of a working machine, the present inventor has identified further possibilities to assisting the operator, without having to resort to forcing the operator to wear e.g. a HMD, allowing further risk reductions when operating a working machine at e.g. a construction site or the like.

SUMMARY

According to an aspect of the present disclosure, the above is at least partly alleviated by an information system for a working machine, the information system comprising an illumination arrangement arranged to project an image onto an area externally of said working machine, and a control unit adapted to control the illumination arrangement, wherein the control unit is adapted to receive construction data of a portion of a surrounding of the working machine, form the image to be projected based on the construction data, receive information of a present location of the working machine, and project the image onto the area based the present location of the working machine.

In accordance to the present disclosure, it is thus possible to allow for any projection of information for assisting the operator to take place at an area externally of said working machine, i.e. without having to resort to presenting the information at a fixed or a mobile (e.g. HMD) display as proposed in accordance to prior-art. Rather, for example the ground surface surrounding the working machine is used as a "canvas" for presenting the assisting information.

In addition, the information presented is not only based on where for example an implement comprised with the working machine is located, but also external constructional information relating to the surrounding of the working machine is used, together with a current location of the working machine, for forming the information/image to be projected at e.g. said ground surface.

An advantage following this implementation is that the operator of the working machine may be allowed to "at all times" place his focus at the "right place", which typically is at the surrounding of the working machine rather that within the operator compartment comprised of the working machine. In addition, the projected information will be readily available to more than a single person/operator, without having to provide each and every operator/person with e.g. a dedicated HDM or similar. Rather, the information may typically be projected where and when "needed", further assisting interaction between e.g. an operator of the working machine and further personnel working in the surrounding of the working machine.

The illumination arrangement should be understood to mean an arrangement or a device that is capable of providing a visible illumination, including for example markings, icons, text, video, images, etc., in a vicinity of the working machine. The illumination arrangement may comprise different type of light sources, such as e.g. light emitting diodes (LED), or an array of LEDs, etc. Other alternatives are of course conceivable, such as e.g. lasers, image/video projectors, etc. The illumination arrangement may also be arranged to provide a movable illumination in relation to the working machine. Hence, the illumination arrangement can controllably illuminate different positions in the vicinity of the working machine irrespective of the specific position of the working machine. Also, the illumination arrangement can provide a visual illumination at different distances from the working machine. For example, the illumination arrangement may be able to both illuminate a position in close proximity to a body structure of the working machine, as well as a position a distance away from the body structure.

The control unit may in one embodiment be an electronic control unit (ECU) is typically provided as an onboard component of the working machine, the working machine for example being an excavator, a wheel loader, an articulated hauler, a dozer, a grader and a backhoe loader, or any form of corresponding construction equipment. The working machine may, in some embodiments, comprise an internal combustion engine, or be at least one of a pure electrical vehicle (PEV) and a hybrid electric vehicle (HEV). Furthermore, it should be understood that the information of the present location of the working machine for example may be received from a geolocation arrangement, such as for example a GLONASS or GPS receiver comprised with the working machine. Information relating to the position of the working machine may also comprise information relating to a relative orientation of the working machine.

In a non-limiting example of the present disclosure, the construction data may comprises information indicative of a construction situation below the ground surface, for example being indicative of tubes and/or cables arranged below the ground surface. Accordingly, the control unit may for example receive the construction data (possible also comprising map information) relating to how the surrounding of the working machine, from a constructional perspective, at present is arranged. Thus, the exemplified tubes and/or cables may be "visualized" for the operator at their actual location, thereby assisting the operator when he/she is e.g. operating an implement for the excavator to ensure that the implement does not make unintentional contact with the tubes and/or cables.

However, it should be understood that construction data not only must relate to a present constructional environment surrounding the working machine. Rather, the construction data may also include information relating to a desired constructional future surrounding the working machine. That is, the construction data may in form embodiments of the present disclosure be indicative of a part or portion of a constructional task to be performed by the working machine. As such, the construction data may relate to an instruction to the operator for perform a specific task using the implement for the excavator, such as digging a hole in ground at a specific location. Thus, the image formed and projected may include a marking of where the digging is to take place ("digging instructions"), together with the above mentioned information of present constructions that must be taken into account for (e.g. the mentioned tubes and/or cables).

In a possible embodiment, the construction data is received from e.g. a database arranged in communication with the control unit. The database may in one embodiment be arranged onboard the working machine. However, in another embodiment the database is arranged remotely from the control unit and possibly accessed using a network connection such as the Internet. The construction data may in one embodiment be provided as three-dimensional positional data relating to a construction or work site where the working machine is operating. Possibly, the construction data may include map information defining specific positions at the construction/work site where e.g. a digging operation is to be performed by the working machine (in case the working machine is equipped to perform such an operation).

In addition to the above, the control unit may be further adapted to receive geographical data relating to a surrounding of the working machine. Such geographical data may possibly be acquired using one or a plurality of sensors arranged at or in the vicinity of the working machine. Such a sensor or sensors may for example include at least one of camera, a laser scanner, a radar arrangement, an IR based arrangement and a Lidar arrangement. The geographical data may, as a complement to the construction data, relate to e.g. how the ground surface is arranged, relate to possible structures or obstacles in the surrounding of the working machine, etc. The geographical data may, in one embodiment, be included when forming the image to be projected at the area externally of the working machine. In accordance to present disclosure, it may additionally be possible to include sensor means adapted for determining information indicative or e.g. underground geology and physical properties. Such underground sensor means may for example include means for surface-wave analysis, etc.

Furthermore, it may in some embodiments of the present disclosure be desirable to also estimate the present position of the operator in relation to the working machine, for example using an eye and/or head tracking mechanism connected to the control unit, and to adjust the formation of the image to be projected based on the estimated position. With the estimated position available, it may be possible to allow e.g. perspective views of the image to be correctly projected when seen from the operator's present position. The estimation may be performed by determining an essentially exact location of the operator, or alternatively by e.g. estimating that the operator is located in the operator compartment comprised with the working machine.

According to another aspect of the present disclosure there is provided a method for assisting an operator of a working machine using an information system, the information system comprising an illumination arrangement arranged to project an image onto an area externally of said working machine and a control unit adapted to control the illumination arrangement, wherein the method comprises the steps of receiving, at the control unit, construction data of a portion of a surrounding of the working machine, forming, by the control unit, the image to be projected based on the construction data, receiving, at the control unit, information of a present location of the working machine, and projecting, using the illumination arrangement, the image onto the area based the present location of the working machine. This aspect of the present disclosure provides similar advantages as discussed above in relation to the previous aspect of the present disclosure.

It should be understood that the concept according to the present disclosure may be implemented as a computer program, adapted to e.g. be executed using a control unit comprised with the above discussed working machine. In addition, such an implementation of the present disclosure provides similar advantages as discussed above in relation to the previous aspects of the present disclosure. The computer program may for example be stored onto a computer readable medium, where the computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1:
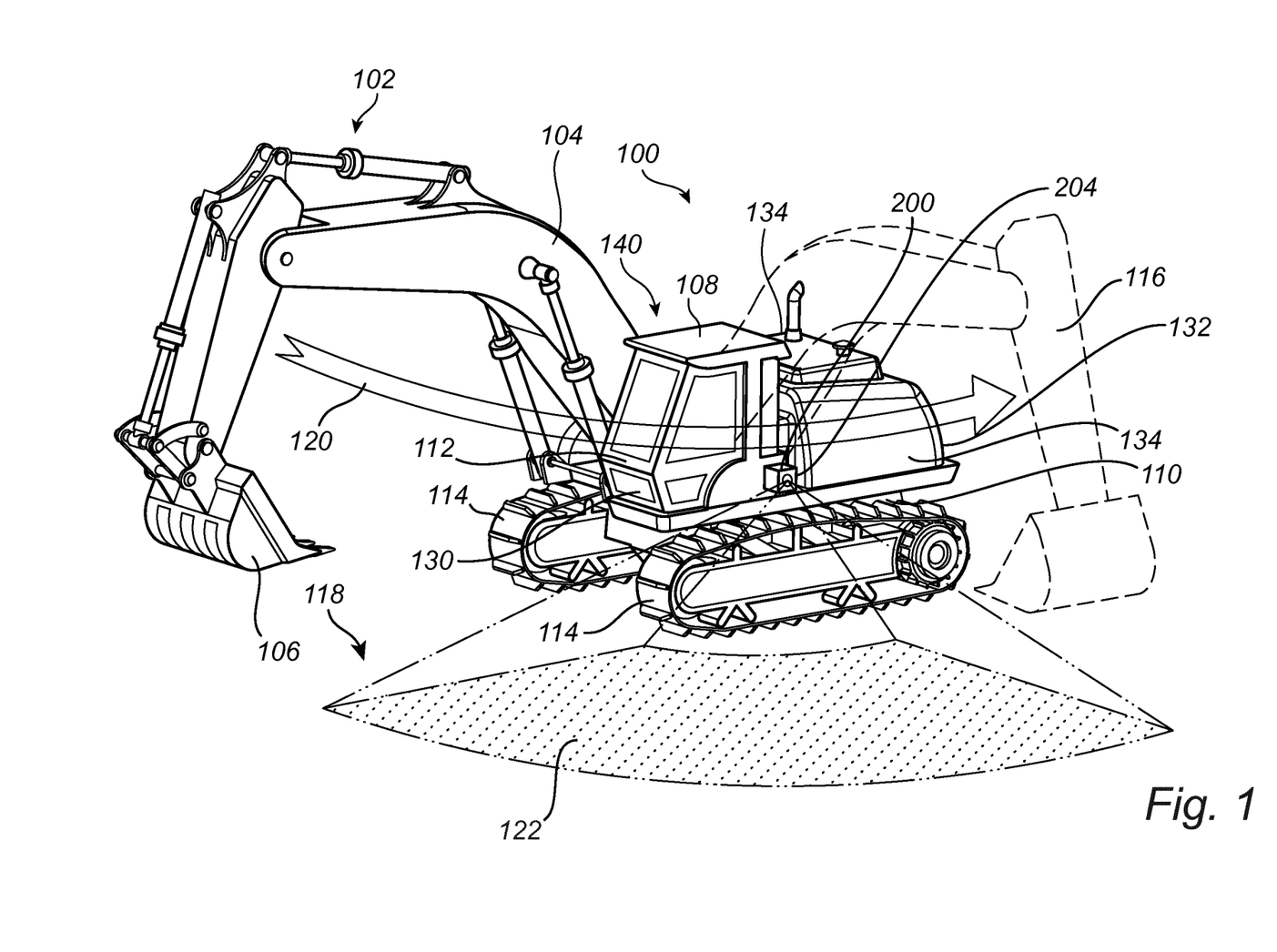
FIG. 1 is a perspective view of a working machine in the form of an excavator provided with an information system according to the present disclosure.

With particular reference to FIG. 1, there is provided a working machine 100 in the form of an excavator 100. The excavator 100 comprises movable load unit arrangement 102, which movable load unit arrangement 102 comprises a boom arm 104 and an implement 106. In the embodiment depicted in FIG. 1, the implement 106 is a bucket, although other implements are conceivable as well, such as e.g. a gripping tool, etc. The excavator 100 comprises an upper structure 108 and a lower structure 110, wherein the upper 108 and lower 110 structures are movable relative to each other. In detail, the upper structure 108 can rotate relative the lower structure 110 around a substantially vertical geometric axis (not shown). The load unit arrangement 102 is connected to the upper structure 108 of the excavator 100, which makes it rotatably movable relative to the lower structure 110 as well as relative to the ground surface 118 thereof. The load unit arrangement 102 can also be lifted and lowered relative to the ground surface 118 such that the distance between the implement 106 and the ground surface 118 increases/reduces. In addition, the implement 106 can be tilted relative to the boom arm 104. As further illustrated in FIG. 1, the upper structure 108 comprises a compartment 112 for housing an operator of the excavator 100, while the lower structure 110 comprises a pair of ground engaging members 114 in the form of caterpillar treads 114. Other ground engaging members 114 are also conceivable, such as e.g. wheels, etc.

As described, the load unit arrangement 102 is movable relative to the lower structure 110, as well as relative to the ground surface 118. FIG. 1 depicts the movement from a first, present point in time at which the load unit arrangement 102 is depicted with solid lines, to a future point in time. The load unit arrangement 102 is depicted with dashed lines 116 at the future point in time. The movement from the present position to the future position is depicted by arrow 120.

The working machine 100 further comprises an information system 200. A detailed description of the information system 200 and its implementation and operation in relation to the working machine is given in relation to the description below.

Figure 2:
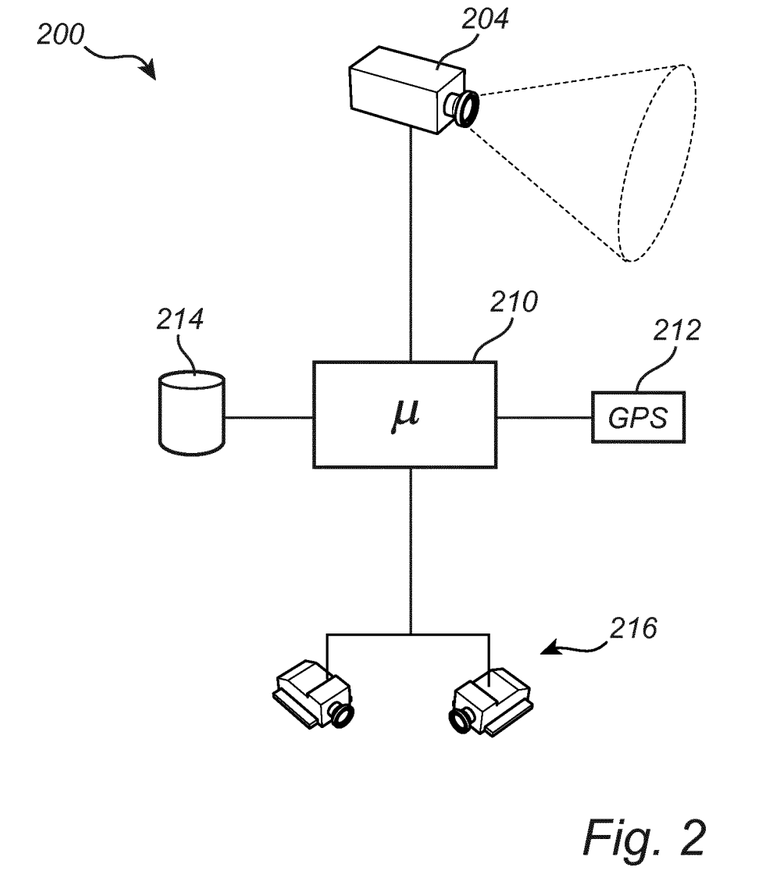
FIG. 2 conceptually shows the information system according to an example embodiment of the present disclosure.

Turning now to FIG. 2, there is conceptually shown a possible implementation of the information system 200. As exemplified, the information system 200 comprises an illumination arrangement 204 arranged to project an image onto an area 122 externally of said working machine 100, such as the ground surface 118 surrounding the working machine 100. In the illustrated example in FIG. 1, the illuminated area 122 corresponds generally to an area where the implement 106 is to be used for digging a hole. Further details of various alternative ways of illuminating the area 122 and/or the ground surface 118 are given below in relation to the description of FIGS. 3A and 3B.

The illumination arrangement 204 can as discussed above comprise a plurality of light sources arranged at various positions of the working machine 100, an image or video projector, a laser projector, or similar means for presenting information at the area 122. For example, the working machine 100 may be provided with a plurality of illumination arrangements 204, possibly arranged at the front side 130, the rear end 132 as well as on both lateral sides 134 of the body structure 140 of the working machine 100.

The information system 200 further comprises a control unit 210, such as an electronic control unit (ECU), adapted to form the image to be projected by the illumination arrangement 204. The control unit 210 is further adapted to control the illumination arrangement 204. The control unit 210 may for example be manifested as a general-purpose processor, an application specific processor, a circuit containing processing components, a group of distributed processing components, a group of distributed computers configured for processing, a field programmable gate array (FPGA), etc.

The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The control unit 210 is further adapted to receive information indicative of a present location of the working machine 100, such as from a geolocation arrangement 212 comprised with the working machine 100. The geolocation arrangement 212 may for example comprise a GPS receiver 212 or a local positioning arrangement at a construction site, such as for example a Wi-Fi positioning system. It may, as understood by the skilled addressee, be necessary to use an alternative to satellite navigation in case the working machine is operating underground, such as for example in a mine or similar. In addition, the control unit 210 may be adapted to receive information relating to an orientation of the working machine 100, relative to e.g. the work site, thus allowing the working machine 100 both positioned and oriented in a desired manner. Such orientation information may for example be provided by the GPS receiver 212 or using a separate compass functionality provided with the working machine 100. In the exemplary implementation shown in FIG. 2, the control unit 210 is further adapted to receive construction data that has been previously stored in a database 214 arranged in communication with the control unit 210.

As indicated above, the database 214 may be arranged onboard the working machine 100 or remotely from the working machine 100. In case the database 214 is arranged remotely from the working machine 100 the information system 200 may comprise a transceiver (not shown) used for establishing a network connection with the database 214.

In addition to the above, the control unit 210 is preferably adapted to receive sensor data relating a surrounding of the working machine 100, such as from a camera arrangement 216. The camera arrangement 216 may, in some embodiments, be a three-dimensional (3D) camera adapted to be used for forming a 3D representation of the surrounding of the working machine 100. Accordingly, the control unit 210 is adapted to implement a feedback functionality where the received construction data is correlated with the information collected using e.g. the camera arrangement 216 for determining a matching between a current state at e.g. the work/construction site (i.e. collected using the camera arrangement 216) and the "desired" end result provided by the construction data. The correlation will further allow for the projected image to be updated in a corresponding manner, i.e. to be continuously dependent on the current status of the work/construction site.

It should further be understood that is may be possible to allow for an enhanced determination of the position of the working machine 100 in relation to the work/construction site by allowing "fixed objects" marked in the construction data to be identified by e.g. the camera arrangement 216, thus providing a relation between the working machine 100 and the fixed objects for determining the present location of the working machine 100.

Figure 3A:
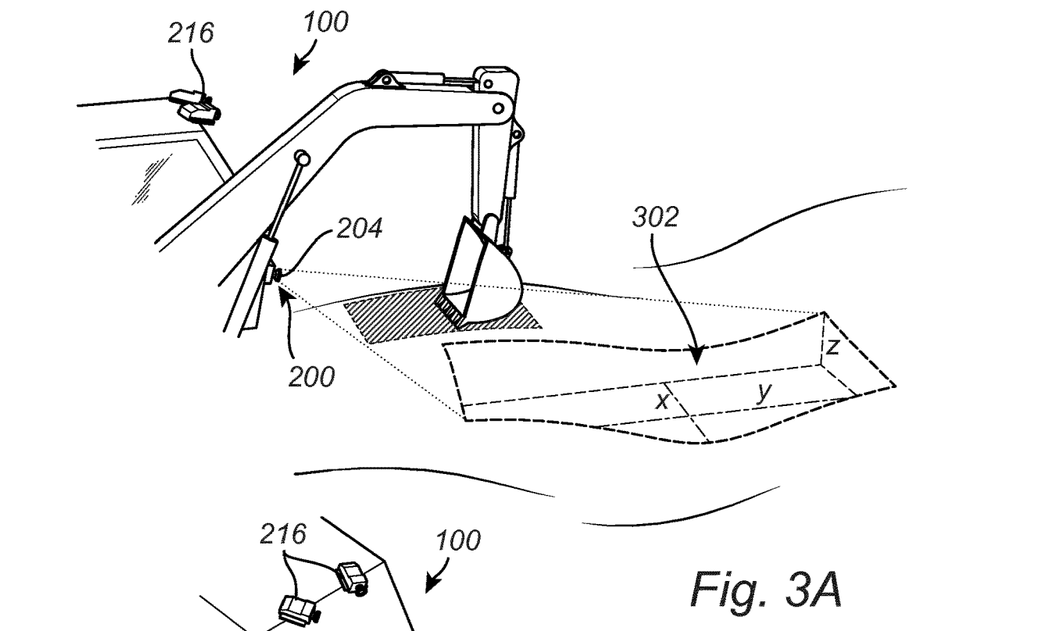
FIGS. 3A and 3B are conceptual illustrations of possible formed images projected onto an area externally of the working machine shown in FIG. 1.
Figure 3B:
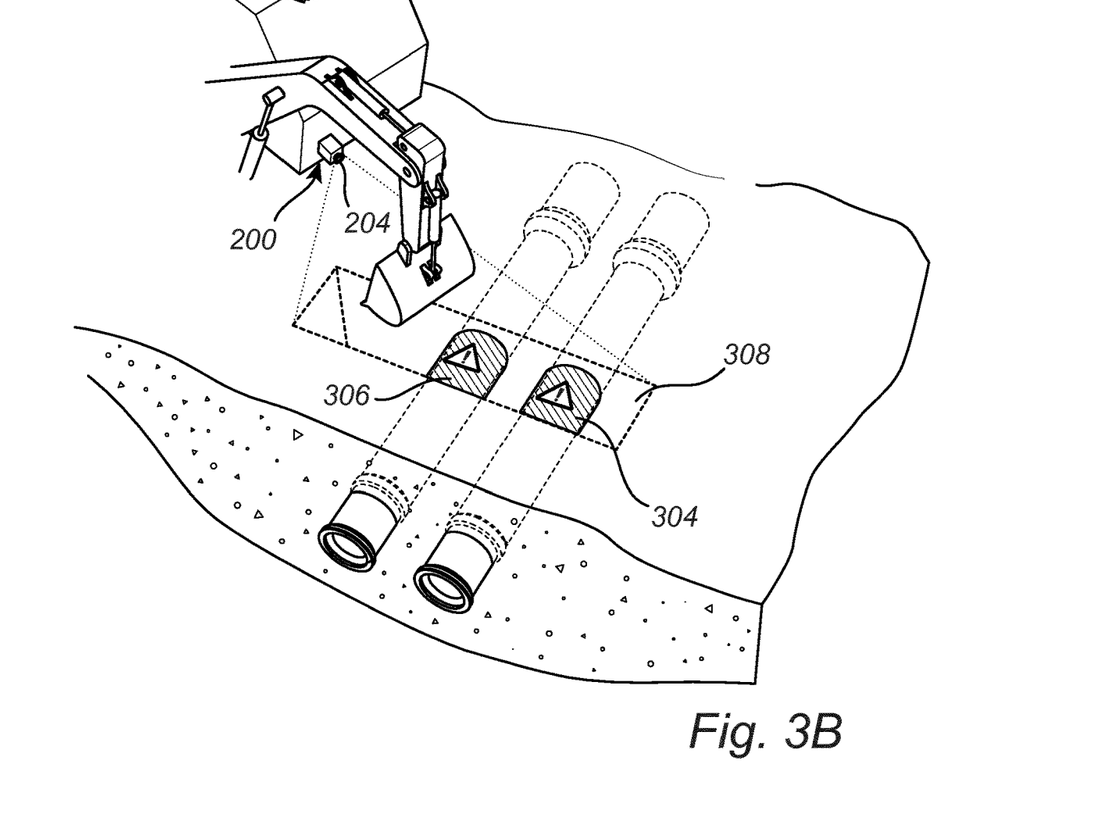
Figure 4:
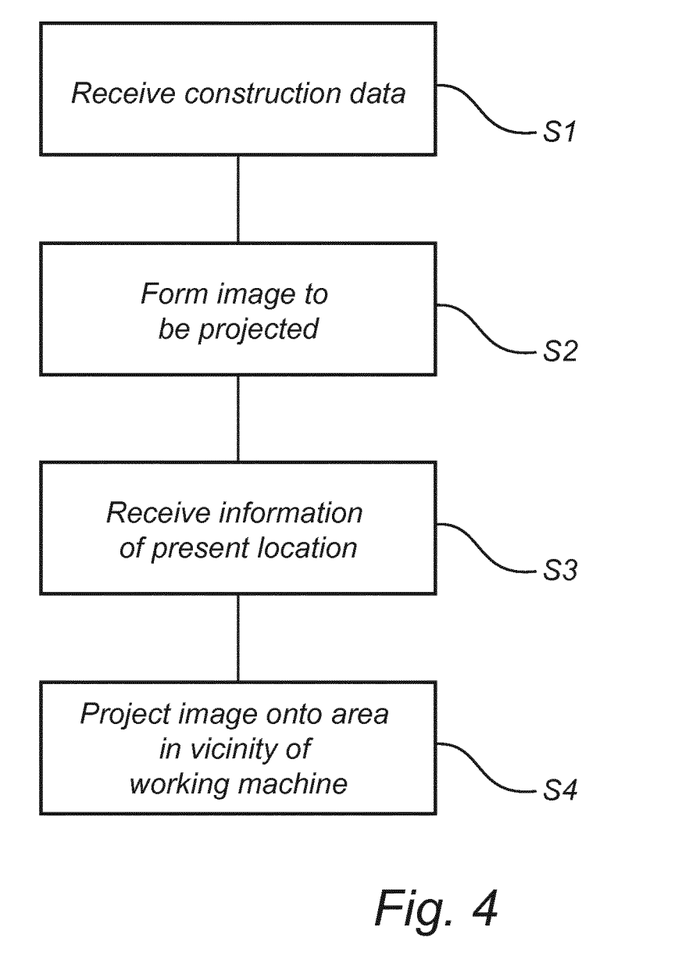
FIG. 4 illustrates the processing steps for performing the method according to the present disclosure.

With further reference to FIGS. 3A and 3B in conjunction with FIG. 4, there is provided two examples of assisting the operator of the working machine 100 using the information system 200.

In FIG. 3A the operator is provided with detailed instructions for digging a hole 302. This is according to the presented embodiment achieved by receiving, S1, the above-mentioned construction data relating to the surrounding of the working machine 100. In FIG. 3A, the construction data comprises an indication of a position and dimension, X-Y-Z (e.g. presented in centimeters or meters, or similar) of the hole 302 to be dug. Based on the construction data, the control unit 210 forms a suitable image to be projected at the area 122, i.e. where the hole 302 is to be dug. The image is in the illustrated embodiment a three-dimensional representation of the future hole 302. The image may also comprise informational text to be presented to the operator.

The control unit 210 will also receive, S3, information of a present location of the working machine, 100, such as from the GPS receiver 212. The control unit 210 will take the present location into account when subsequently projecting, S4, the formed image onto the area 122. The image is in this embodiment selected to also comprise an instruction/marked area where the operator is to position the landfill removed from the hole 302.

As an alternative and as shown in FIG. 3B, the image may include further information to be projected within the area 122. Such information is in FIG. 3B illustrated to include information relating to a pipe/tube 304 and an electrical cable 306 positioned underground the ground surface 118. Accordingly, the operator will have direct knowledge of where the tube 304 or cable 306 is located and may thereby avoid coming in their contact when digging e.g. a ditch 308. In a possible embodiment the marking relating to the tube 304 or cable 306 may be provided in different colors depending on e.g. how close the implement is determined to be in relation to the "real" tube/cable. For example, in case a distance is above a predetermined threshold (such as e.g. 0.5 m) the markings 304/306 may be yellow, whereas in case the distance is below or at the threshold the marking may be switched to red. Similarly, the markings 304/306 may be allowed to "flash" on and off in case the implement is determined to be positioned with a distance below the threshold. In one embodiment it may additionally be possible to provide the operator with an audible warning in case the distance is determined to be below the threshold, for example using a speaker system arranged within the operator compartment.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. An information system for a working machine, the working machine comprising a user operable implement, the information system comprising:
   an illumination arrangement arranged to project an image onto a physical ground surface located within an area externally of the working machine, and
   a control unit adapted to control the illumination arrangement, wherein the control unit is adapted to:
   receive construction data of a portion of a surrounding of the working machine including the area externally of the working machine,
   form the image to be projected based on the construction data, the construction data comprising information indicative of a construction situation below the ground surface,
   receive information of a present location and orientation of the working machine, and
   project the image onto the surface based on the present location and orientation of the working machine using the illumination arrangement to assist the user in operating the implement relative to the construction situation below the ground surface, wherein the illumination arrangement comprises an image projector,
   wherein the control unit is further adapted to control an orientation of the illumination arrangement in relation to the working machine and the ground surface, whereby the projected image at the ground surface is made independent on a present location and orientation of the working machine.

2. The information system according to claim 1, wherein the construction data comprises information indicative of tubes and/or cables arranged below the ground surface.

3. The information system according to claim 1, wherein the control unit is further adapted to receive geographical data relating to a surrounding of the working machine.

4. The information system according to claim 1, wherein the control unit is further adapted to receive sensor data relating to a surrounding of the working machine.

5. The information system according to claim 4, wherein the sensor data is received from at least one of a camera, a laser scanner, a radar arrangement and a Lidar arrangement.

6. The information system according to claim 3, wherein the control unit is further adapted to adjust the formation of the image based on the received data relating to the surrounding of the working machine.

7. The information system according to claim 1, wherein the control unit is further adapted to adjust the formation of the image based on a present position of an operator of the working machine.

8. The information system according to claim 6, wherein the control unit is further adapted to receive information of the present position of the operator.

9. The information system according to claim 1, wherein the information of the present location of the working machine is received from a geolocation arrangement comprised with the working machine.

10. The information system according to claim 1, wherein the construction data is stored with a database arranged in communication with the control unit.

11. A working machine comprising an information system according to claim 1.

12. The working machine according to claim 11, wherein the working machine is at least one of an excavator, a wheel loader, an articulated hauler, a dozer, a grader and a backhoe loader.

13. A method for assisting an operator of a working machine using an information system, the working machine comprising a user operable implement, the information system comprising an illumination arrangement arranged to project an image onto a physical ground surface located within an area externally of the working machine and a control unit adapted to control the illumination arrangement, wherein the method comprises:
   receiving, at the control unit, construction data of a portion of a surrounding of the working machine including the area externally of the working machine,
   forming, by the control unit, the image to be projected based on the construction data, the construction data comprising information indicative of a construction situation below the ground surface,
   receiving, at the control unit, information of a present location and orientation of the working machine, and
   projecting, using the illumination arrangement, the image onto the surface based on the present location and orientation of the working machine using the illumination arrangement to assist the user in operating the implement relative to the construction situation below the ground surface, wherein the illumination arrangement comprises an image projector,
   wherein the control unit is further adapted to control an orientation of the illumination arrangement in relation to the working machine and the ground surface, whereby the projected image at the ground surface is made independent on a present location and orientation of the working machine.

14. The method according to claim 13, further comprising:
   receiving, at the control unit, geographical data of a surrounding of the working machine, and
   adjusting the formation of the image based on the geographical data of the surrounding of the working machine.

15. The method according to claim 13, further comprising:
   receiving, at the control unit, information of the present position of the operator, and
   adjusting the formation of the image based on the present position of an operator of the working machine.

16. A non-transitory computer readable medium carrying a computer program comprising program means for the method according to claim 13 when said program means is run on a computer.

* * * * *